J. SOLLENBERGER.
Wagon-Brake.
No. 10,604.  Patented Mar. 7, 1854.
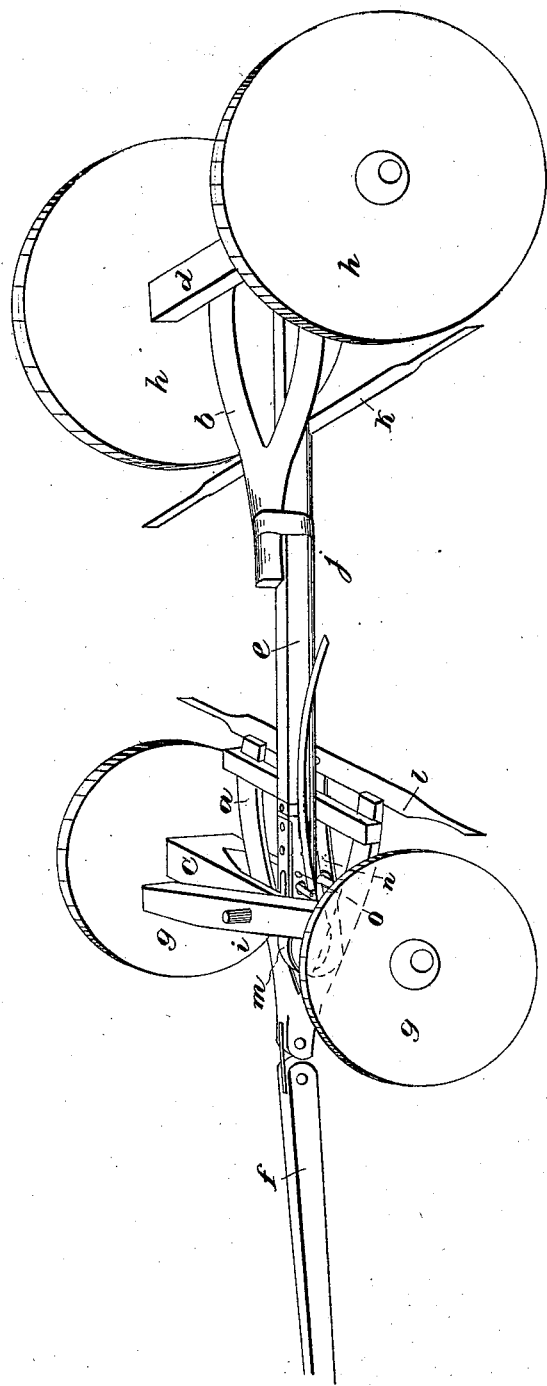

UNITED STATES PATENT OFFICE.

JOSEPH SOLLENBERGER, OF HIGGINSPORT, OHIO.

CARRIAGE-BRAKE.

Specification of Letters Patent No. 10,604, dated March 7, 1854.

*To all whom it may concern:*

Be it known that I, JOSEPH SOLLENBERGER, of Higginsport, Brown county, Ohio, have invented certain new and useful Improvements in Self-Acting Brakes for Carriages; and I do hereby declare the following to be a full, clear, and exact description thereof, reference being had to the annexed drawing, making part of this specification.

My invention has for its object, the self-locking of carriage wheels, by an arrangement of such simplicity, as to make it generally applicable, and at the same time efficient in its operation; whether it be to prevent the crowding of the carriage against the horses in descending a hill, or to check the backing of a balky horse.

In the accompanying drawing, the running gear of a carriage embodying my improvement is represented by a perspective view, in which—

(*a*) are the fore hounds and (*b*) the hind hounds.

(*c*) is the front axletree. (*d*) is the hind one.

(*e*) is the coupling pole.

(*f*) is the tongue, secured in the usual way to the fore hounds.

(*g*) are the front and (*h*) the hind wheels.

(*i*) is the king bolt. The aperture for the king-bolt in the forward end of the coupling pole is slotted, so as to permit the play forward and backward of the bolt, and with it, the entire forward running gear. Secured in such a way as to be capable of sliding backward and forward beneath the coupling-pole, is an iron bar (*j*) through whose forward end the king-bolt passes; and on the pressing back of the forward running gear and consequently of the king-bolt, the bar (*j*) is pushed back, and a crossbar (*k*) fastened to its rear end, is by this means brought to bear against the hind-wheels, thus acting as a brake or lock; at the same time the power so employed presses back the front wheels against another bar (*l*) through means of the peculiar connection of the bar (*l*) with the forward end of the coupling pole, by a stiff iron bar (*m*) which (having a joint *n*) just below the king-bolt, and consequently at the center of vibration of the forward running gear) permits the latter to turn with perfect freedom in any direction, while the brake is left equally free to act with undiminished force in every relative position of all the wheels.

When it is desired to back without bringing the brakes into action; a pin (*o*) is slipped in behind the king-bolt, which preventing its backward motion, at once arrests all action of the brakes.

I therefore claim—

The mode of applying the fore and hind wheel rubbers by means of the connection *m* and *n* applied to the fore rubbers (*l*) as described and in connection therewith the connection (*j*) applied to the hind rubbers (*k*) as described, so that the fore wheels may be acted on in the rear and the rear wheels in front, substantially in the manner and for the purpose described.

In testimony whereof, I have hereunto set my hand before two subscribing witnesses.

JOSEPH SOLLENBERGER.

Witnesses:
GEO. H. KNIGHT,
J. H. GETZENDANNEN.